United States Patent
McFarland et al.

(10) Patent No.: US 6,628,673 B1
(45) Date of Patent: Sep. 30, 2003

(54) SCALABLE COMMUNICATION SYSTEM USING OVERLAID SIGNALS AND MULTI-CARRIER FREQUENCY COMMUNICATION

(75) Inventors: William McFarland, Los Altos, CA (US); Teresa H. Meng, Portola Valley, CA (US)

(73) Assignee: Atheros Communications, Inc., Sunnyvale, CA (US)

(*) Notice: Subject to any disclaimer, the term of this patent is extended or adjusted under 35 U.S.C. 154(b) by 0 days.

(21) Appl. No.: 09/474,602

(22) Filed: Dec. 29, 1999

(51) Int. Cl.$^7$ .................................................. H04J 1/00
(52) U.S. Cl. ...................... 370/481; 370/441; 370/480; 375/346; 375/356
(58) Field of Search ................................ 370/481, 441, 370/480, 486, 294, 335, 465, 484; 375/356, 346, 140, 146; 455/503, 69

(56) References Cited

U.S. PATENT DOCUMENTS

| | | | | |
|---|---|---|---|---|
| 5,261,118 A | * | 11/1993 | Vanderspool, II et al. | 455/503 |
| 5,400,322 A | * | 3/1995 | Hunt et al. | 370/468 |
| 5,499,236 A | * | 3/1996 | Giallorenzi et al. | 370/441 |
| 5,506,867 A | * | 4/1996 | Kotzin et al. | 375/220 |
| 5,742,527 A | * | 4/1998 | Rybicki et al. | 370/484 |
| 5,870,427 A | * | 2/1999 | Tiedemann, Jr. et al. | 375/216 |
| 5,914,932 A | | 6/1999 | Suzuki et al. | 370/203 |
| 5,966,644 A | | 10/1999 | Suzuki | 455/76 |
| 6,005,893 A | * | 12/1999 | Hyll | 375/260 |
| 6,044,067 A | | 3/2000 | Suzuki | 370/252 |
| 6,125,103 A | * | 9/2000 | Bauml et al. | 370/203 |
| 6,160,820 A | * | 12/2000 | Isaksoon et al. | 370/480 |
| 6,215,778 B1 | * | 4/2001 | Lomp et al. | 370/335 |

OTHER PUBLICATIONS

Rohling et al. "Performance comparison of different multiple access schemes for the downlink of an OFDM communication system" (1997 IEEE 47$^{th}$ Vehicular Technology Conference Phoenix Az, May 4–7, 1997; pp. 1365–1369).

Viterbi, "The orthogonal–random waveform dichotomy for digital mobile personal communication" (Proc. 1993 IEEE Int'l Symposium on Information Theory, Jan. 17–22, 1993, pp. 18–23).

Pottie et al., "Channel coding strategies for cellular radio" (Abstract, Proc. 1993 IEEE Int'l Symposium on Information Theory, Jan. 17–22, 1993).

Olofsson, "Interference diversity gain in frequency hopping GSM" (1995 IEEE 45$^{th}$ Vehicular Technology Conference, Jul. 25–28, 1995).

Alikhani, et al., "BDMA Band division multiple access" (undated, pp. 482–488).

(List continued on next page.)

*Primary Examiner*—Huy D. Vu
*Assistant Examiner*—M. Phan
(74) *Attorney, Agent, or Firm*—Pillsbury Winthrop LLP

(57) ABSTRACT

A communication system such as an OFDM or DMT system has nodes which are allowed to transmit continuously on one or just a few of the sysiem's frequency sub-channels, while the other nodes avoid putting any signal into those sub-channels. Simple low data rate nodes are allowed to use a small number of sub-channels while more complicated nodes use the remainder, and preferably functionality is provided to ensure that adjacent sub-channels are reliably spaced apart in frequency so that they do not bleed over into one another; to ensure that signals from all nodes arrive at the base station with well-aligned symbol transitions; and to ensure that signals from the various nodes arrive at the base station with similar power levels.

10 Claims, 4 Drawing Sheets

OTHER PUBLICATIONS

Chuang, "An OFDM–based system with dynamic packet assignment and interference suppression for advanced cellular internet service" (IEEE Globecom 1998 pp. 974–979).

Wolfgang Eberle et al., "Design Aspects of an OFDM Based Wireless LAN With Regard to ASIC Integration", Published at 2. OFDM–Fachgerspräch, Braunschweig, Germany, Sep. 16–17, 1997. 4 pp.

Shinsuke Hara et al., "Transmission Performance Analysis of Multi–Carrier Modulation in Frequency Selective Fast Rayleigh Fading Channel", Wireless Personal Communications 2, 1996, pp. 335–356.

John A.C. Bingham, "Multicarrier Modulation for Data Transmission: An Idea Whose Time Has Come", IEEE Communications Magazine, vol. 28, No. 5, May 1990, pp. 5–14.

H. Rholing et al., Comparison of Multiple Access Schemes for and OFDM Downlink System, First Intern, Workshop on Multi–Carrier Spread Spectrum, Apr. 1997.

Alvin M. Despain, "Very Fast Fourier Transform Algorithms Hardware for Implementation", IEEE Transactions on Computers, vol. C–28, No. 5, May 1979, pp. 333–341.

Clark D. Thompson, "Fourier Transforms in VLSI", IEEE Transactions on Computers, vol. C–32, No. 11, Nov. 1993, pp. 1047–1057.

* cited by examiner

SCALABLE COMMUNICATION SYSTEM USING OVERLAID SIGNALS AND MULTI-CARRIER FREQUENCY COMMUNICATION

CROSS-REFERENCE TO RELATED APPLICATIONS

This application is related to the U.S. patent application entitled "Method and Apparatus for Eliminating the Effects of Frequency Offsets in a Digital Communication System", filed on Oct. 12, 1999 in the names of Teresa H. Meng, David K. Su and Masoud Zagari, also hereby incorporated by reference and referred to herein as "Meng I"; and to the U.S. patent application entitled "Method and Apparatus for Closed-Loop and Open-Loop Timing Control for Digital Communications Systems" filed on Oct. 21, 1999 in the name of Teresa H. Meng, hereby incorporated by reference and referred to herein as "Meng II".

BACKGROUND OF THE INVENTION

1. Field of the Invention

The present invention is directed to communication systems and networks and is particularly directed to such systems and networks which use multi-channel, multi-frequency protocols such as orthogonal frequency division multiplexing and discrete multi-tone protocols.

2. Background of the Related Art

Orthogonal frequency division multiplexing (OFDM) and discrete multi-tone (DMT) are two closely related formats which have become popular as communication protocols. System is of this type take a relatively wide bandwidth communication channel and break it into many smaller frequency sub-channels. The narrower sub-channels are then used simultaneously to transmit data at a high rate. These techniques advantages when the communication channel has multi-path or narrow band interference.

The following discussion of the prior art and the invention will address OFDM systems; however, it will be understood that the invention is equally applicable to DMT systems (as well as other types of communication systems) with only minor modifications that will be readily apparent to those skilled in the art.

A functional block diagram of a typical OFDM transmitter is shown in FIG. 1. Here, an incoming stream 10 of N symbols $d_0, d_1 \ldots d_{N-1}$ is mapped by a serial-to-parallel converter 20 over N parallel lines 30, each line corresponding to a particular subcarrier within, the overall OFDM channel. An Inverse Fast Fourier Transform circuit 40 accepts these as frequency domain components and generates a set 50 of time domain subcarers corresponding thereto. These are converted by a parallel-to-serial converter 60. Due to the characteristics of the inverse Fourier transform, although the frequency spectra of the subcarrier channels overlap, each subcarrier is orthogonal to the others. Thus, the frequency at Which each subcarrier in the received signal is evaluated is one at which all other signals are zero.

A functional block diagram of the corresponding OFDM receiver is shown in FIG. 2. Here, an OFDM signal is received and converted into multiple time domains signals 210 by a serial-to-parallel converter 220. These signals are processed by a Fast Fourier Transform processor 230 before being multiplexed by parallel-to-serial converter 240 to recover the original data stream 250.

Systems such as OFDM and DMT systems either do not share the main channel with other users at all (e.g., when they are implemented using a telephone modem), or share the channel in time (e.g., when implemented in TDMA and CSMA schemes); thus, their flexibility and ease of use is limited. Sharing the channel in time (i.e. allowing only one user to transmit at a time) has two serious disadvantages. First, to maintain high throughput, all nodes sharing the channel must operate at a high data rate, and therefore be equally complex; thus, no less-complicated processing circuitry which might otherwise be used with low data rate channels can be employed. Second, a user who actually desires a low data rate must send data as very short high speed bursts over the network. In order to overcome propagation loss in the path, such a node must transmit at a high peak power because the transmit power is proportional to the peak data rate. Again, economies inherent in the low data rate processing car to be exploited.

As a practical example, the IEEE 802.11 a communication standard specifies transmission with 52 sub-channel frequencies. This requires substantial signal processing; a high transmit power while active to achieve significant range; a large peak-to-average ratio while actively transmitting; high resolution ADCs and DACs; and very linear transmit and receive chains. While such complicated hardware allows transmission up to 50 Mb/s, this lever of performance is overkill for something like a cordless phone, which only requires roughly a 32 kb/s transmission rate.

In connection with the peak to average ratio, note that for 52 sub-channels, while transmitting the peak-to-average ratio of the signal is $52^2/52=52$ in power. Therefore, to avoid distortion of the signal, the power amplifier must be substantial enough to provide fail more instantaneous power than is required on average., Since the peak-to-average ratio is directly proportional to the number of sub-channels, building a lower capacity unit that uses fewer carriers can substantially decrease the costs of such a device.

SUMMARY OF THE INVENTION

The present invention has been made in view of the above shortcomings of the prior art, and an object of the,present invention is to provide a system which implements multi-frequency communication but allows channel sharing between users in a way that would allow simple nodes such as a 32 kb/s cordless phone to transmit continuously at a low rate while other high speed nodes such as 20 Mb/s video streams communicate at a much higher data rate simultaneously.

It is another object of the present invention to provide such a system in which nodes of three or more data rate requirements can simultaneously be used within the system.

It is a further object of the invention to provide such a system in which node communication frequencies can be reliably controlled so that they do not cause communication errors.

It is yet another object of the present invention to provide such a system in which node communication timings can be reliably controlled so that they do not cause communication errors.

It is still another object of the present invention to provide such a system in which node transmission powers can be reliably controlled so that they do not cause communication errors.

At least some of the above objects are achieved according to a first aspect of the invention by providing a communication system such as an OFDM or DMT system in which the simple nodes are allowed to transmit continuously on one or just a few of the frequency sub-channels, while the other nodes avoid putting any signal into those sub-channels.

According to a second aspect of the present invention, simple low data rate nodes are allowed to use a small number of sub-channels while the more complicated nodes use the remainder, and additional means are used to ensure that adjacent sub-channels are reliably spaced apart in frequency so that they do not bleed over into one another. This may be done by, e.g., using highly accurate frequency references (such as quartz crystals) in each node; locking the frequency used by each node to a highly accurate external reference such as a Global Positioning System (GPS) satellite; locking the frequency used by each node to the transmit frequency of the base station; and adjusting the frequency used by each node according to closed-loop feedback signals sent by the base station.

In a third aspect of the invention, simple low data rate nodes are allowed to use the few sub-channels while leaving the rest to high data rate nodes, and additional means are provided to ensure that signals from all nodes arrive at the base station with well-aligned symbol transitions. This may be done by, e.g., adjusting the transmission of packets at the nodes according to a highly accurate external time reference such as the GPS satellite mentioned above; adjusting the transmission of packets at the nodes according to closed-loop feedback signals sent by the base station; and simply relying on the nodes' close proximity or nearly equal distance to the base station to ensure there is not a significant amount of delay in their transmitted signals.

According to a fourth aspect of the invention, the sub-channels are shared between low data rate nodes and high data rate nodes as described above, and means are provided to ensure that signals from the various nodes arrive at the base station with similar power levels. This may be done by implementing a closed-loop power control scheme in which the strength of each signal is adjusted at the node according to feedback signals sent to it by the base station, or by implementing an open-loop power control scheme in which the strength of each signal is adjusted at the node according to the power level of the base station signal it receives.

BRIEF DESCRIPTION OF THE DRAWINGS

These and other objects, features, and advantages of the present invention are better understood by reading the following detailed description of the preferred embodiment, taken in conjunction with the accompanying drawings, in which.

DETAILED DESCRIPTION OF PRESENTLY PREFERRED EXEMPLARY EMBODIMENTS

Figure 1:
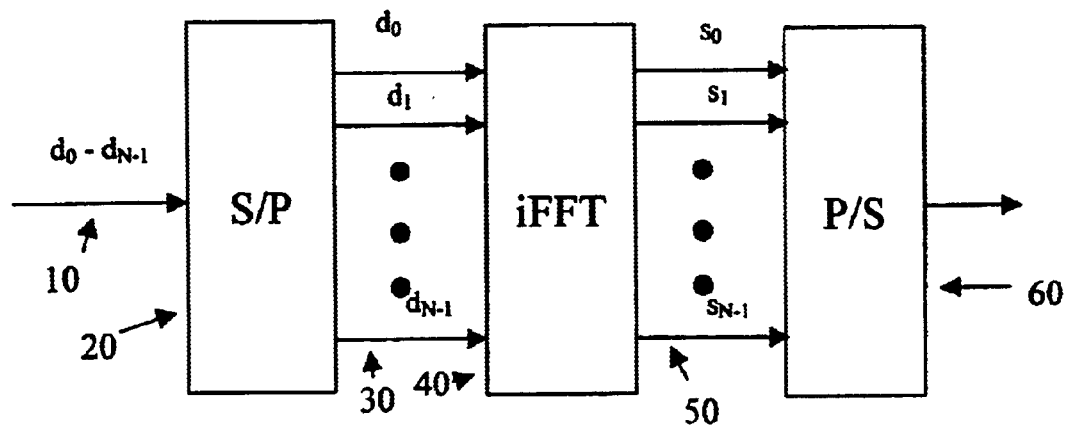
FIG. 1 is a block diagram of an OFDM transmitter according to the prior art.
Figure 2:
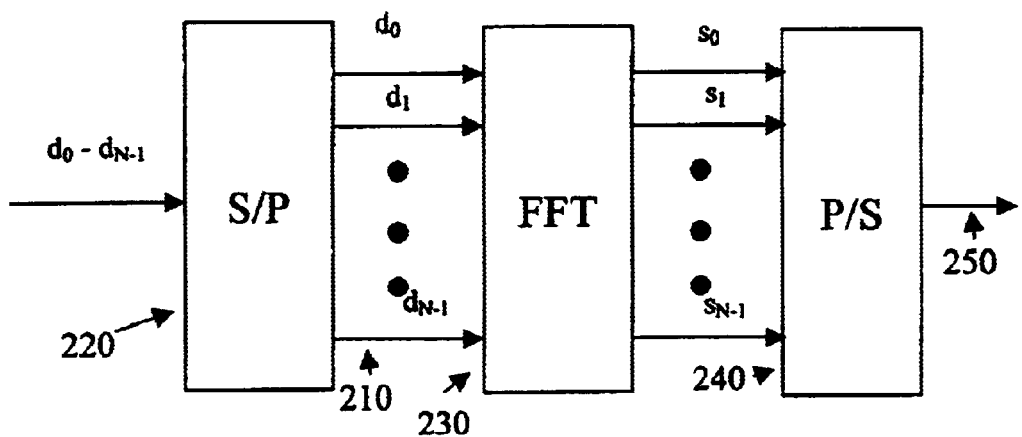
FIG. 2 is a functional block diagram of an OFDM receiver according to the prior art.
Figure 3:
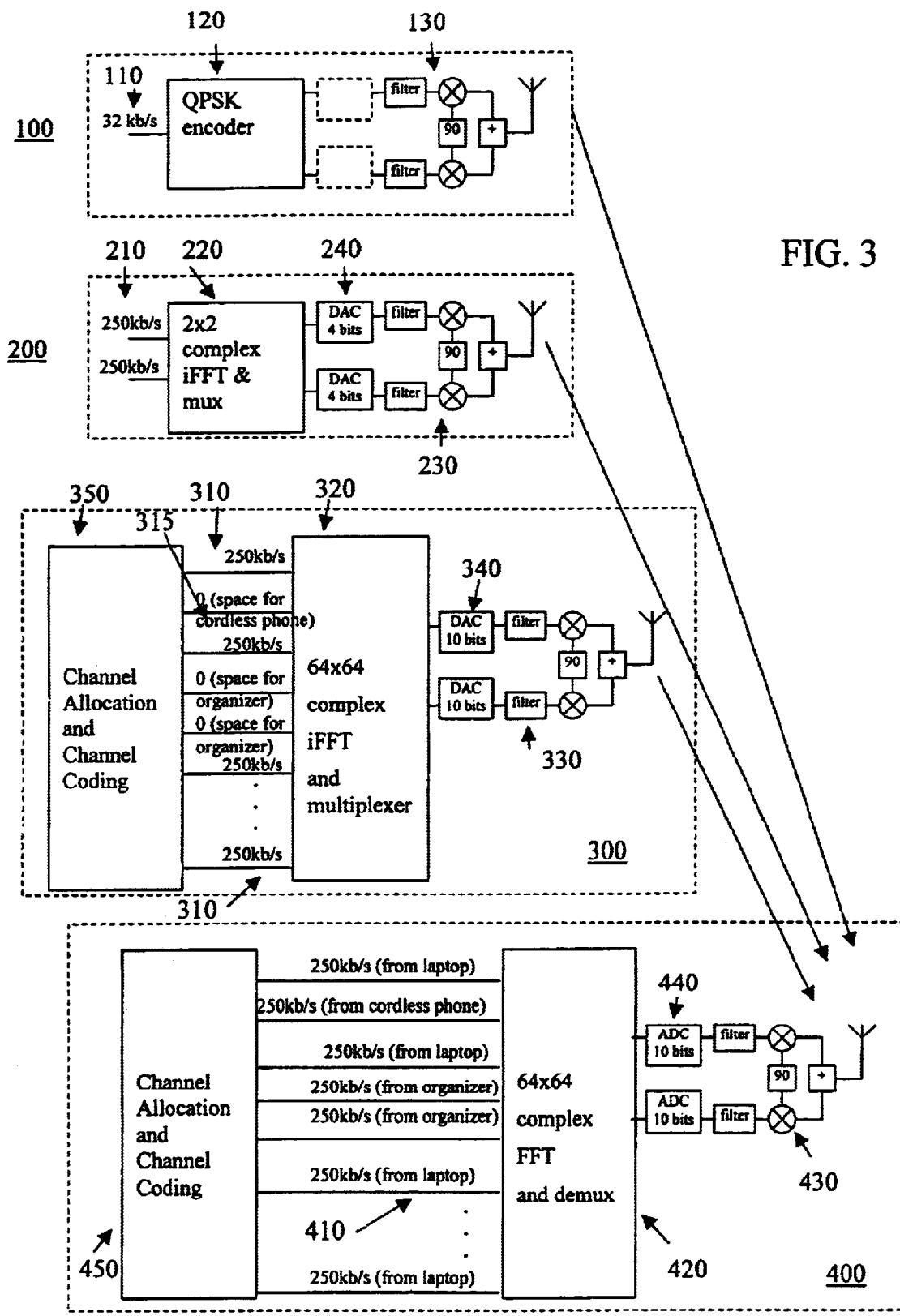
FIG. 3 is a diagram of node transmission according to a preferred embodiment of the present invention.

FIG. 3 shows a diagram in which cordless phone 100, an organizer 200, and a laptop computer 300 are simultaneously communicating With a base station in a first preferred embodiment of the present invention. Here, the cordless phone 100 receives or generates a data stream 110 representative of, e.g., 32 kb/s audio information. This data is encoded by a relatively simple quadrature phase shift keying (QPSK) encoder 120 and processed by filtering and modulation circuitry 130 as is known in the art. Due to the low data rate of the phone 100, the QPSK encoder 120 can be used in place of a more complicated IFFT processor as is conventionally used in OFDM systems. Further, use of the QPSK encoder 120 permits elimination of the digital to analog converters (DACs) normally used to render the IFFT product in an analog form suitable for filtering and transmission.

The organizer 200, on the other hand, is a device requiring a moderate data, communication rate and, although it requires more complicated circuitry than the cordless phone 100, can still make use of simpler hardware than prior art OFDM nodes. Specifically, the organizer receives a few, e.g., two, 250 kb/s data streams 210 and processes them through a 2×2 complex IFFT processor and parallel-to-serial converter 220 (performing the IFFT transform and multiplexing). The processed signals are then converted into, analog form by a pair of 4-bit digital-to-analog converters 240 (relatively low resolution DACs may be used due to the need to process only a small number of sub-channels) and then filtered and transmitted by circuitry 230 as known in the art.

The laptop 300 is typically the most complicated device of the three and therefore has the highest data rate requirements. It receives a set of, e.g., 61 250 kb/s data streams 310 (as well as three zeroed streams 315 to hold the place for the channels of the other two devices) and processes them in a 64×64 complex IFFT processor and parallel-to-serial converter 320. Similar to the organizer 200, the result is converted into analog form by dual DACs 340 (note that DACs having 10-bit resolution are required in the laptop 300) and filtered and transmitted in circuitry 330 as is known in the art.

Transmissions from each of the nodes are received by a base station 400, processed by demodulation and filtering circuitry 430, and converted into digital form by dual 10-bit analog-to-digital converters 440 as known in the art. The result is demultiplexed and proceed in a fast Fourier transform processor 420 before being output to subsequent circuitry as a set of data streams 410. Depending on the application, the data streams 410 can be further processed as will be readily apparent to those skilled in the art. Further, the data streams 410 can be used by a channel allocation and coding unit 450 which monitors reception quality, bit errors rates and the like of the data streams 410 for use in making channel allocation and coding decisions as will be described in greater detail below. When the unit 450 determines that nodes should change channels, it issues the appropriate command as a data packet which is included in the transmission of base station 400.

As can be seen above, this embodiment of the present invention permits multiple node devices 100–300 of varying levels of complexity to communicate with a base station 400 over a single OFDM system by allowing the simpler evinces 100 and 200 to communicate on a few sub-channels 315 within the OFDM channel, and ensuring that these do not interfere with the most complex device 300 using most of the sub-channels 310 by preventing device 300 from using these sub-channels 315 (in this case, by zeroing those sub-channels 315 at the FFT 420 in the main device 300; however, other equivalent methods can of course be used). Further, the sub-channels 315 may be predetermined, or the simpler nodes 100 and 200 can communicate on any subset of channels by changing the tuning of their up-converting synthesizers, or by doing a numerical frequency offsetting in the digital domain, although a digital-to-analog converter might be needed in that case.

In this way, the circuitry for the simpler nodes, e.g., the cordless phone 100, can be simplified relative to that in the laptop 300 because lower resolution is required in the phone DAC (or no phone DAC at all is required); less digital computation is necessary in the phone, 100 due to its lower data communication rate; and a lower peak to average ratio is required in the cordless phone transmitter (since fewer sub-channels are used simultaneously).

Figure 4:
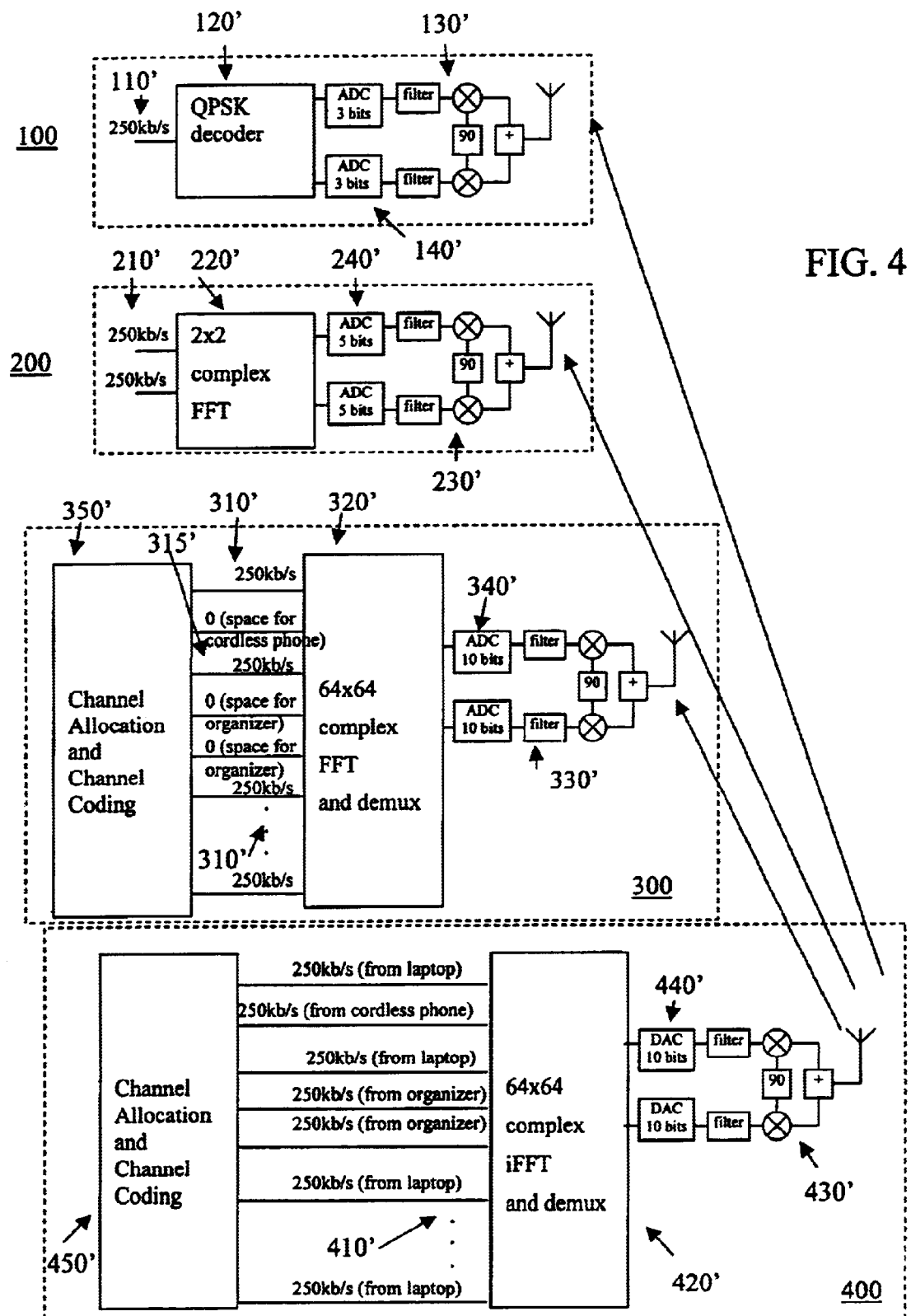
FIG. 4 is a diagram of base station transmission according to a preferred embodiment of the present invention.

FIG. 4 shows the situation when the base station 400 is transmitting and the other nodes 100–300 are receiving. Here, components within each node 100–300 and the base station 400 relevant to this operation are illustrated. That is, the base station 400 receives a set of data streams 410' to be variously transmitted to the cordless phone 100, organizer 200 and laptop 300 and processes them in a 64×64 complex iFFT processor and multiplexer 420' to produce dual digital data streams which are converted into analog form by a pair of digital-to-analog converters 440' and then filtered and transmitted by circuitry 430' as is known in the art.

Transmissions from base station 400 are received by dordless phone 100 by receiving circuitry 130' and converted to digital form by dual three-bit analog-to-digital converters 140' (although corresponding DACs were omitted in the transmitting anode of FIG. 3, ADCs are preferably used in the receiving node due to noise in the received base station signal). The output of the analog-to-digital converters 140' is sent to a QPSK decoder 120' which outputs a 32 kb/s data stream correspond to its counterpart in the base station data stream set 410'.

In organizer 200, transmissions from the base station 400 are received; processed by receiving circuitry 230' and supplied to a pair of five-bit analog-to-digital converters 240' (similar to the node 100, five-bit ADCs are preferably used here rather than the four-bit DACs in the version of FIG. 3 due to noise in the received base station signal). The converters' output is supplied to a 2×2 complex FFT and demultiplexer 220' which generates two 250 kb/s data streams 210' corresponding to their counterparts in the base station data stream selt 410'.

Finally, the laptop 300 receives base station transmissions and processes them with receiving circuitry 330'. The results are converted into digital form by dual analog-to-digital converters 340' and applied to a 64×64 complex FFT and demultiplexer 320' which outputs the 61 data streams 310' corresponding to the laptop channels in base station data stream set 410', while leaving the streams corresponding to the cordless phone 100 and organizer 200 at zero.

Channel allocation and coding unit 350' in the laptop 300 monitors the datadstreams 310' for bit errors, lost packets and the like much like its counterpart 450 in the base station 400; however, rather than unilaterally making channel allocation changes to improve communication like the unit 450, the unit 350' can cause the laptop 300 to send requests to the base station 400 to change or reallocate channels. Depending on constraints imposed by other nodes, the base station 400 may or may not accept the recommendation and transmit the appropriate command.

Thus, the cordless phone 100 (and, to a lesser degree, the organizer 200) is much simpler than a full blown DMT/OFDM unit as represented by the laptop 300. The cordless phone 100 has less resolution required in its ADC 140' (and no DAC is required); less digital computation conducted in its QPSK encoder 120 and decoder 120' compared to the IFFT processor and multiplexer 320 used in the laptop 300; and lower linearity requirements in the receive chain.

The assignment of sub-channels to various users can be simple, or can be quite sophisticated to optimize performance of the complete system. For example, a node may use a single or small subset of sub-channels as shown by nodes a and b in FIG. 5, which respectively occupy sub-channels 2 and 5 in a hypothetical nine-channel system.

Figure 5:
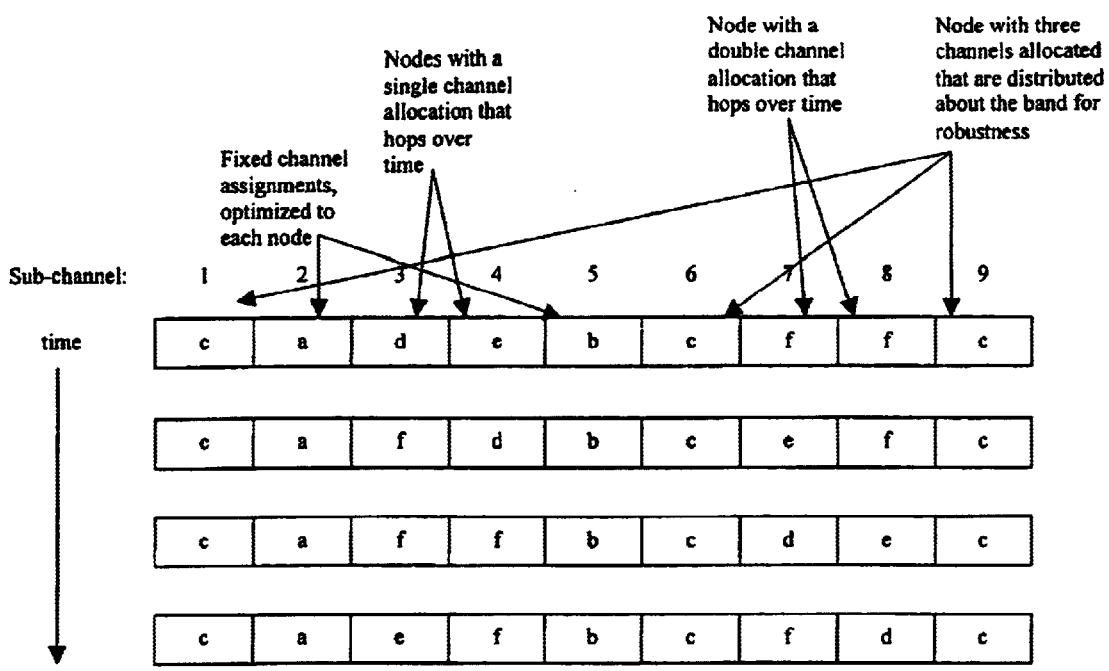
FIG. 5 is a diagram of channel switching techniques in the preferred embodiment.

Such an arrangement might run into problems from interference, or it he cancellation of a small range of frequencies due to multi-path propagation effects (narrow fading) which are detected by the channel allocation and channel coding section 450 by monitoring the quality of the data streams 410. To prevent this, the subset of channels assigned to this node might be spaced out across the entire range of sub-channels available within the band. For example, four of 48 sub-channels might be used, spaced evenly across the band by using sub-channel 1, 13, 25, and 37. Thus narrow band interference or fading might eliminate one of the four sub-channels within the signal, but the other three would remain. Given sufficient coding to overcome the loss of one of the four sub-channels, the message would get through. This technique is illustrated in FIG. 5, in which node c uses sub-channels 1, 6 and 9.

Another way to provide similar robustness would be to "hop" the sub-channels in use over time. This approach would work even for the case in which only one sub-channel is used at a time. For example, the node could transmit on sub-channel 1 in the first time period, then switch to channel 13 in the next period. Packets lost when the node is on a frequency that has interference or fading could be retransmitted after the next "hop". Several such hopping nodes could be supported at the same time, hopping between the same set of sub-channels in a sequential basis. In FIG. 5, this technique is illustrated by nodes d and e in FIG. 5—node d sequentially uses sub-channels 3, 4, 7 and 8, while node e consecutively uses sub-channels 4, 7, 8 and 3.

A similar arrangement could be used for nodes that use multiple sub-channels simultaneously, hopping them all in contiguous blocks, or spreading them out as described above and hopping the entire spread of sub-channels from one channel set to another over time. This is illustrated in FIG. 5 by channel f, which sequentially uses sub-channels 7 and 8, then sub-channels 3 and 8, then sub-channels 3 and 4, and finally sub-channels 4 and 7.

Even more sophisticated methods could be applied. Narrow band fading and interference are likely to affect different nodes within a network differently due to the various nodes' locations. Thus a given sub-channel may work poorly for some of the nodes, but it might work well for other nodes. The sub-channels could therefore be intelligently allocated, swapping the assignments between nodes until all nodes are satisfied.

Other adjustments might be made to accommodate the needs of individual nodes in the network. For example, nodes that are a long distance from the base station or other nodes in the network might be allocated more channels for a given required data rate. Generally, it is easier to send a given data rate in a wider bandwidth than to fit the same data rate into: a narrow bandwidth. For example, a node at the edge of range might be given four sub-channels instead of just one so that it can transmit using a QPSK (4-QAM constellation) rather than a 64-QAM constellation. This would significantly reduce the required signal to noise ratio to get the message through, thereby increasing the range to this node.

Similarly, the total transmit power emanating from a base station could be allocated unequally among the sub-channels, allowing more power to be spent on the nodes which are farther away, or nodes that are trying to fit a large amount of data through a narrow sub-channel. Additionally, similar to the nodes which provide zero magnitude data for sub-channels which are in use by other nodes to avoid transmitting signals on the corresponding frequencies, the base station may use zero magnitude data for sub-chariness which are not used by any node, thereby saving power and reducing the base station transmitter's peak-to-average ratio.

Frequency Control

While the first preferred embodiment of the present invention provides such advantages in comparison with the prior art, certain aspects of the invention may be even further improved. For example, in order for base, station 400 to properly receive all of the signals simultaneously, the separate transmitting nodes must transmit their signals with very well matched sub-channel frequencies. In an OFDM system based on the IEEE 802.11 standard, for example, the sub-channels must be spaced apart by ~300 kHz. Thus, on a 5 GHz carrier, an inaccuracy of 60 parts per million would cause a sub-channel to be transmitted into the adjacent sub-channel, making it impossible to receive either signal.

To reduce this possibility, several techniques are available as will be understood with reference to the Meng I application. For example, the system may use very accurate reference frequency crystals to insure that the frequency accuracy of transmissions is much better than 60 ppm. Alternatively, the system may ensure that each of the nodes 100–300 maintains its frequency using a GPS receiver that receives a very accurate frequency reference from a GPS satellite and locks transmissions to that reference frequency. The base station 400, too, may lock its transmission frequency to that of the GPS satellite.

Frequency control in the system also may be accomplished by locking all the transmission frequencies in the nodes 100–300 to the frequencies transmitted by the base station 400. Alternatively, frequency control may be implemented by allowing the base station 400 to feed back information to the node in the form of a command signal, adjusting the transmit frequency in a closed loop fashion.

Timing Control

In addition to the above-described frequency considerations, a second area of concern is that in order to efficiently process all the received signals in the same FFT-based receiver in base station 400, all signals must arrive at the base station 400 with fairly well-aligned symbol transitions. Specifically, all signals from nodes 100–300 must arrive time-aligned within the guard time allocated for multi-path echoes in the environment. In typical indoor environments, this is ~100 ns.

Symbol transition alignment can be implemented using techniques akin to those described above for establishing strict frequency control. For example (these and the following techniques may be more readily understood with reference to the Meng II application), a GPS unit may be used to give each node 100–300 (as well as base station 400) a very accurate absolute time reference. This time information is then used in each node 100–300 to adjust the time of transmitting a data packet therefrom such that it arrives at the base station 400 well time-aligned relative to all the other signals.

The system also may implement timing control by causing the base station 400 to send commands adjusting packet transmit timing to each of the nodes 100–300 and the nodes 100–300 adjust their timing in a closed-loop fashion. Alternatively, when the system is intended to operate over relatively short ranges, nodes 100–300 may get their timing entirely from the arrival of signals from the base station 400, since the maximum "flight" time differences between nodes 100–300 will not be large.

Power Control

In a third operational consideration in the invention, all signals transmitted from nodes 100–300 preferably arrive at the base station 400 with similar power levels. This is because a signal that is much too strong would swamp the ADCs in the base station 400, while a signal transmitted from one of nodes 100–300 that is much too weak would be lost in the noise from the other channels and not reliably received by the base station 400.

Similar to the above closed-loop control techniques, the system may use the base station 400 to send signals to nodes 100–300 which indicate whether each node 100–300 should transmit with more or less power. The system may alternatively implement open-loop control by having each node 100–300 adjust its power based on the power level it is receiving from the base station 400.

It should be noted that the above difficulties do not typically occur when a single base station transmits to all other nodes simultaneously. Because all signals are emanating from the same source, it is easy to insure that frequency sub-channels do not overlap, that all signals have their symbol transitions at the same time, and that the power level of all sub-channels is the same as transmitted and therefore as received. However, it is possible for the base station to vary its allocation of transmit power amongst the various nodes to enhance efficiency.

The present invention has been described above in connection with a preferred embodiment thereof; how ever, this has been done for purposes of illustration only, and the invention is not so limited. Indeed, variations of the invention will be readily apparent to those skilled in the art and also fall within the scope of the invention.

What is claimed is:

1. A communication system comprising:

a plurality of nodes, each for transmitting simultaneously with other nodes a signal unique to that node and representative of at least one non-overlapping sub-channel conveying information, each at least one information-conveying non-overlapping sub-channel for each node being different from each information-conveying non-overlapping sub-channel for all other nodes;

a base station for simultaneously receiving the signals transmitted from each node and processing them to generate, for each information-conveying sub-channel, a signal representative of the information conveyed thereby, the base station including means for generating and transmitting a command signal to the at least one node based on the power of signals from the at least one node as received by the base station;

frequency controlling means for controlling the frequencies of signals transmitted by at least one node;

timing control means for controlling timing of signals sent by the at least one node; and, power control means for controlling power of signals sent by the at least one node, the power control means being disposed in the at least one node and being responsive to command signals from the base station transmitted to the at least one node.

2. A communication system comprising:
a plurality of nodes, each for transmitting simultaneously with other nodes a signal unique to that node and representative of at least one non-overlapping sub-channel conveying information, each at least one information-conveying non-overlapping sub-channel for each node being different from each information-conveying non-overlapping sub-channel for all other nodes;
a base station for simultaneously receiving the signals transmitted from each node and processing them to generate, for each information-conveying sub-channel, a signal representative of the information conveyed thereby,
frequency controlling means for controlling the frequencies of signals transmitted by at least one node;
timing control means for controlling timing of signals sent by the at least one node; and,
power control means for controlling power of signals sent by the at least one node, the power control means including means for sensing the power of signals from the base station received at the at least one node and controlling the power of signals transmitted from the at least one node responsive thereto.

3. A communication system comprising:
a base station for transmitting a signal representative of a plurality of non-overlapping sub-channels conveying information, a plurality of groups of sub-channels each corresponding to one of a plurality of nodes, the base station including means for generating and transmitting a command signal to each node based on the timing of signals from the at least one node as received by the base station;
frequency controlling means for controlling the frequencies of signals transmitted by the at least one node; and,
timing control means for controlling timing of the signals sent by the at least one node, the timing control means being disposed in the at least one node and being responsive to command signals from the base station transmitted to the at least one node;
wherein the nodes are for simultaneously receiving the signal transmitted by the base station and processing it to generate, for each information-conveying sub-channel corresponding to the node, a data stream representative of the information conveyed thereby.

4. A communication system comprising:
a base station for transmitting a signal representative of a plurality of non-overlapping sub-channels conveying information, a plurality of groups of sub-channels each corresponding to one of a plurality of nodes, the base station including means for receiving a timing reference signal from a satellite and controlling the timing of signals transmitted from the base station according thereto;
frequency controlling means for controlling the frequencies of signals transmitted by the at least one node; and,
timing control means for controlling timing of the signals sent by the at least one node;
wherein the nodes are for simultaneously receiving the signal transmitted by the base station and processing it to generate, for each information-conveying sub-channel corresponding to the node, a data stream representative of the information conveyed thereby.

5. A communication system comprising:
a base station for transmitting a signal representative of a plurality of non-overlapping sub-channels conveying information, a plurality of groups of sub-channels each corresponding to one of a plurality of nodes;
frequency controlling means for controlling the frequencies of signals transmitted by the at least one node; and,
power control means for controlling power of signals sent by the at least one node, the power control means including means for sensing the power of signals from the base station received at the at least one node and controlling the power of signals transmitted from the at least one node responsive thereto;
wherein the nodes are for simultaneously receiving the signal transmitted by the base station and processing it to generate, for each information-conveying sub-channel corresponding to the node, a data stream representative of the information conveyed thereby.

6. A communication system comprising:
a base station for transmitting a signal representative of a plurality of non-overlapping sub-channels conveying information, a plurality of groups of sub-channels each corresponding to one of a plurality of nodes, the base station including means for generating and transmitting a command signal to the at least one node based on the power of signals from the at least one node as received by the base station;
frequency controlling means for controlling the frequencies of signals transmitted by the at least one node; and,
power control means for controlling power of signals sent by the at least one node, the power control means being disposed in the at least one node and being responsive to command signals from the base station transmitted to the at least one node;
wherein the nodes are for simultaneously receiving the signal transmitted by the base station and processing it to generate, for each information-conveying sub-channel corresponding to the node, a data stream representative of the information conveyed thereby.

7. A communication system comprising:
a plurality of nodes, each for transmitting simultaneously with other nodes a signal unique to that signal's node and representative of at least one non-overlapping sub-channel conveying information, each at least one information-conveying non-overlapping sub-channel for each node being different from each information-conveying non-overlapping sub-channel for all other nodes; and,
a base station for simultaneously receiving the signals transmitted from each node and processing them to generate, for each information-conveying sub-channel, a signal representative of the information conveyed thereby,
wherein the base station is for intelligently changing an assignment of nodes to sub-channels used by those nodes for optimal reception by the base station of the signals transmitted from each node, the base station is for intelligently changing the assignment of nodes to channels with respect to reception factors dependent on each node's location.

8. A communication system comprising:
a plurality of nodes, each for transmitting simultaneously with other nodes a signal unique to that signal's node and representative of at least one non-overlapping sub-channel conveying information, each at least one information-conveying non-overlapping sub-channel for each node being different from each information-conveying non-overlapping sub-channel for all other nodes; and, a base station for simultaneously receiving the signals transmitted from each node and processing them to generate, for each information-conveying sub-channel, a signal representative of the information conveyed thereby, wherein the base station is for intelligently changing an assignment of nodes to sub-channels used by those nodes for optimal reception by the base station of the signals transmitted from each node, the base station is for intelligently changing the assignment of nodes to channels to minimize at least one of fading and interference.

9. A communication system comprising:

a base station for transmitting a signal representative of a plurality of non-overlapping sub-channels conveying information, a plurality of groups of sub-channels each corresponding to one of a plurality of nodes;

wherein the nodes are for simultaneously receiving the signal transmitted by the base station and processing it to generate, for each information-conveying sub-channel corresponding to the node, a data stream representative of the information conveyed thereby, the base station is for using multiple sub-channels simultaneously to transmit to at least one of the nodes, the base station is for intelligently changing an assignment of nodes to sub-channels used by those nodes for optimal reception of transmitted signals, and the base station is for intelligently changing the assignment of nodes to channels with respect to reception factors dependent on each node's location.

10. A communication system comprising:

a base station for transmitting a signal representative of a plurality of non-overlapping sub-channels conveying information, a plurality of groups of sub-channels each corresponding to one of a plurality of nodes;

wherein the nodes are for simultaneously receiving the signal transmitted by the base station and processing it to generate, for each information-conveying sub-channel corresponding to the node, a data stream representative of the information conveyed thereby, the base station is for using multiple sub-channels simultaneously to transmit to at least one of the nodes, the base station is for intelligently changing an assignment of nodes to sub-channels used by those nodes for optimal reception of transmitted signals, and the base station is for intelligently changing the assignment of nodes to channels to minimize at least one of fading and interference.

* * * * *